United States Patent
Le Bouthillier et al.

(10) Patent No.: US 12,013,972 B2
(45) Date of Patent: Jun. 18, 2024

(54) SYSTEM AND METHOD FOR CERTIFYING INTEGRITY OF DATA ASSETS

(71) Applicant: QOHASH INC., Quebec (CA)

(72) Inventors: Jean Le Bouthillier, Quebec (CA); Luca Perico, Quebec (CA); Marwen Jadla, Montreal (CA)

(73) Assignee: Qohash Inc., Quebec (CA)

( * ) Notice: Subject to any disclaimer, the term of this patent is extended or adjusted under 35 U.S.C. 154(b) by 215 days.

(21) Appl. No.: 17/616,639

(22) PCT Filed: May 26, 2020

(86) PCT No.: PCT/CA2020/050711
§ 371 (c)(1),
(2) Date: Dec. 3, 2021

(87) PCT Pub. No.: WO2020/243818
PCT Pub. Date: Dec. 10, 2020

(65) Prior Publication Data
US 2022/0237326 A1     Jul. 28, 2022

Related U.S. Application Data

(60) Provisional application No. 62/856,821, filed on Jun. 4, 2019.

(51) Int. Cl.
G06F 21/64     (2013.01)
G06F 21/60     (2013.01)

(52) U.S. Cl.
CPC ............ G06F 21/64 (2013.01); G06F 21/602 (2013.01)

(58) Field of Classification Search
CPC .............................. G06F 21/64; G06F 21/602
See application file for complete search history.

(56) References Cited

U.S. PATENT DOCUMENTS 9,794,074 B2    10/2017   Toll et al.
10,901,974 B2 *   1/2021   Padmanabhan ......... H04L 9/006
(Continued)

FOREIGN PATENT DOCUMENTS

WO     2017049309 A1     3/2017
WO     2017190057 A1    11/2017
(Continued)

OTHER PUBLICATIONS

Aniello, et al., A Prototype Evaluation of a Tamper-Resistant High Performance Blockchain-Based Transaction Log for a Distributed Database, Sep. 2017 in 5 pages.
(Continued)

*Primary Examiner* — Michael R Vaughan
(74) *Attorney, Agent, or Firm* — Davis Wright Tremaine LLP

(57) ABSTRACT

Systems, methods and non-transitory computer readable media are provided for certifying integrity of data assets stored on a client computing system. The data assets are certified by: calculating a state representation of at least one data asset stored on the client computing system using a data verification module deployed to the client computing system; and transmitting the state representation over a network from the client computing system to a remote computing system for storage in an immutable ledger. Systems, methods and non-transitory computer readable media are also provided for verifying integrity of data asserts.

17 Claims, 5 Drawing Sheets

(56) References Cited

U.S. PATENT DOCUMENTS

| | | | |
|---|---|---|---|
| 11,074,663 B2 * | 7/2021 | Rollins | G06Q 50/18 |
| 11,106,811 B2 * | 8/2021 | Natanzon | G06F 3/0623 |
| 11,481,740 B1 * | 10/2022 | Todd | G06Q 20/223 |
| 2017/0046526 A1 | 2/2017 | Chan et al. | |
| 2017/0075938 A1 | 3/2017 | Black et al. | |
| 2017/0249483 A1 * | 8/2017 | Kawazu | G06F 21/64 |
| 2017/0264428 A1 | 9/2017 | Seger, II | |
| 2018/0018723 A1 | 1/2018 | Nagla et al. | |
| 2018/0082296 A1 | 3/2018 | Brashers | |
| 2018/0130034 A1 | 5/2018 | Taylor et al. | |
| 2018/0150835 A1 | 5/2018 | Hunt et al. | |
| 2018/0183592 A1 | 6/2018 | Campagna et al. | |
| 2018/0205537 A1 | 7/2018 | Wilson et al. | |
| 2018/0225448 A1 | 8/2018 | Russinovich et al. | |
| 2018/0240085 A1 | 8/2018 | Balachov et al. | |
| 2019/0014176 A1 | 1/2019 | Tormasov et al. | |

FOREIGN PATENT DOCUMENTS

| | | |
|---|---|---|
| WO | 2018089843 A1 | 5/2018 |
| WO | 2018125989 A2 | 7/2018 |
| WO | 2019081919 A1 | 5/2019 |
| WO | 2020243818 A1 | 12/2020 |

OTHER PUBLICATIONS

McConaghy, et al., BigchainDB: A Scalable Blockchain Database, Jun. 8, 2016 in 65 pages.

Written Opinion issued in related International Application No. PCT/CA2020/050711 on Jul. 20, 2020, in 7 pages.

* cited by examiner

SYSTEM AND METHOD FOR CERTIFYING INTEGRITY OF DATA ASSETS

CROSS-REFERENCE TO RELATED APPLICATIONS

This application is a 371 U.S. National Phase of International Patent Application No. PCT/CA2020/050711, filed May 26, 2020, entitled "SYSTEM AND METHOD FOR CERTIFYING INTEGRITY OF DATA ASSETS," which claims priority to U.S. Provisional Patent Application No. 62/856,821, filed Jun. 4, 2019, the contents of which are incorporated herein by reference in their entirety.

TECHNICAL FIELD

The technical field generally relates to data asset management. More particularly, it relates to systems and methods for assuring and/or certifying the security and integrity of data assets.

BACKGROUND

Over the last several years, computing technology has evolved rapidly, and organizations have grown increasingly dependent on their data assets. Today, organization use their data to make better decisions, better service their clients, and gain a competitive advantage on the market. Given the importance of data assets for organizations, it is often critical to be able to assure the accuracy and consistency of data assets over their entire lifecycle. Consequently, integrity assurance for hardware and data assets is one of the fastest growing and most complex area of risk management.

SUMMARY

According to an aspect, a system for certifying integrity of data assets is provided. The system includes: a data collection module deployed to a client computing system, said data collection module configured to monitor changes in data assets on the client computing system and calculate a state representation of said data assets; an integrity validation module deployed to the client computing system, the integrity validation module configured to validate the integrity of the data collection module and/or hardware of the client computing system; and an immutable ledger module deployed to a remote system, said ledger module receiving and storing the state representation of data assets, and publishing stored state representation to a public blockchain network.

According to an aspect, a method for certifying integrity of data assets is provided. The method includes: monitoring a client computing system to detect a change in a data asset; upon detecting a change in the data asset, calculating a state representation of said data asset on the client computing system; sending the state representation from the client computing system to a remote system; storing the state representation in an immutable ledger on the remote system; and notarizing the ledger via a public blockchain.

According to an aspect, a method for certifying integrity of data assets is provided. The method includes: receiving a request to certify a data asset stored on a client computing system; and responsive to said request: calculating a state representation of said data asset on the client computing system; sending the state representation from the client computing system to a remote system; storing the state representation in an immutable ledger on the remote system; and notarizing the ledger via a public blockchain.

According to an aspect, a system for verifying the integrity of data assets received from an auditor is provided. The system includes a data verification module configured to calculate a state representation of the received data asset; obtain a certified state representation from a remote system, said state representation having been generated by a system on which the data asset was initially created, and certified via an immutable ledger; compare the calculated state representation with the certified state representation to determine if there are any anomalies; and generate a report indicating whether the integrity of the data asset can be verified based on the existence or absence of anomalies.

According to an aspect, a method for verifying the integrity of data assets is provided. The method includes: receiving a data asset from an auditor; calculating a state representation of the received data asset; obtaining a certified state representation from a remote system, said state representation having been generated by a system on which the data asset was initially created, and certified via an immutable ledger; comparing the calculated state representation with the certified state representation to determine if there are any anomalies; and generating a report indicating whether the integrity of the data asset can be verified based on the existence or absence of anomalies. In an embodiment, the method includes generating a report indicating how the integrity of the data asset is established based on the immutable ledger.

According to an aspect, a method for certifying integrity of data assets stored on a client computing system is provided. The method includes: calculating a state representation of at least one data asset stored on the client computing system using a data verification module deployed to the client computing system; and transmitting the state representation over a network from the client computing system to a remote computing system for storage in an immutable ledger.

According to an aspect, a system for certifying integrity of data assets is provided. The system includes: a storage module on a client computing system, the storage module having at least one data asset stored thereon; a data verification module on the client computing system, the data verification module configured to calculate a state representation of the at least one data asset; and a communication module on the client computing system, the communication module configured to transmit the calculated state representation over a network from the client computing system to a remote system for storage in an immutable ledger.

According to an aspect, a method for verifying integrity of data assets originating from a client computing system is provided. The method includes: receiving, on a verification system remote from the client computing system, a state representation corresponding to a data asset to be verified; retrieving a certified state representation from an immutable ledger, the certified state representation having been generated by the client computing system from which the data asset originated; identifying anomalies by comparing the received state representation with the certified state representation; and generating a report indicating whether the integrity of the received data asset can be verified based on the existence or absence of anomalies.

In an embodiment, receiving the state representation on the verification system includes: receiving the data asset to be verified on the verification system; and calculating the state representation of the received data asset.

In an embodiment, a non-transitory computer-readable medium can be provided with instructions stored thereon which, when executed by a processor, cause the processor to carry out any of the methods described above.

According to an aspect, a system for verifying integrity of data assets originating from a remote client computing system is provided. The system includes: an input module configured to receive a state representation corresponding to a data asset to be verified; a communications module configured to retrieve a certified state representation from an immutable ledger, the certified state representation having been generated by the remote client computing system from which the data asset originated; and a data verification module configured to: identify anomalies by comparing the received state representation with the certified state representation; and generate a report indicating whether the integrity of the data asset can be verified based on the existence or absence of anomalies.

In an embodiment, the input module is configured to receive the data asset to be verified, and the data verification module is configured to calculate the state representation of the received data asset.

DETAILED DESCRIPTION

Figure 1:
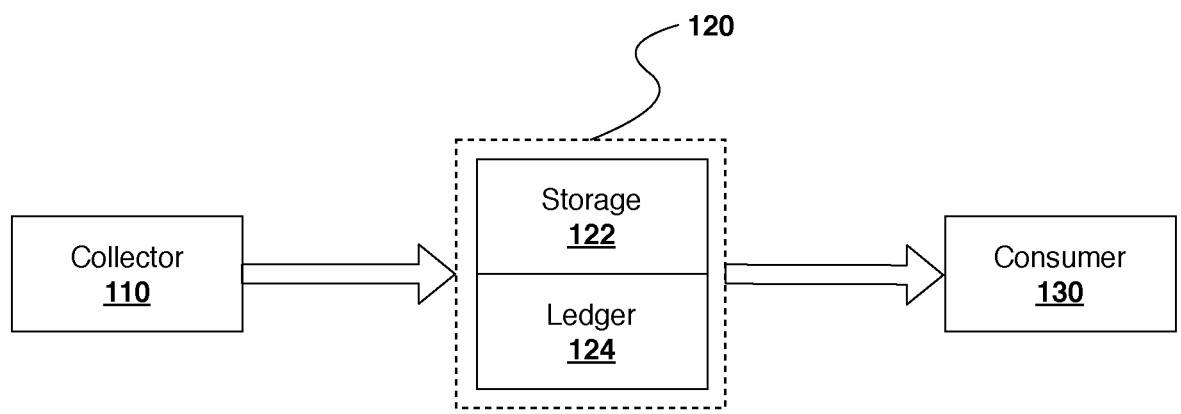
FIG. 1 is a schematic illustrating an architecture for a system for certifying integrity of data assets, according to an embodiment.

With reference to FIG. 1, an architecture 100 for a system for certifying integrity of data assets is schematically illustrated according to an embodiment. Broadly described, the architecture 100 includes a data collector module 110, a data storage module 120, and a data consumer module 130. As will be described in more detail hereinafter, these modules work together in order to provide an end-to-end chain of trust which maintains the integrity of data assets between when they are collected, stored, and eventually accessed.

The data collector module 110 is configured to collect data assets for storage and certification. It is appreciated that "collecting" data assets can refer to collecting the data assets themselves, and/or metadata relating to the data assets. The data assets collected by module 110 can be any type of digital data capable of being interpreted by and/or stored on a computer system. For example, data assets can include files (such as pictures, videos, text files, log files, documents, source code, etc.), databases (including database structures and records stored therein), and streams (including audio, video, or any other type of data stream such as channel, event log, and log streams), among others. As will be described in more detail in embodiments below, the collector module 110 can comprise hardware and/or software components deployed on a client system and/or on a central server to collect data produced or originating from the client system (which can include one or more computing devices and/or a network of computing devices). As can be appreciated, the collector module 110 is preferably configured to ensure the integrity of data between when it is generated and when it is collected, in order to avoid compromising the chain of trust.

The data storage module 120 is configured to store and certify (i.e. ensure the integrity of) the collected data assets and/or metadata relating thereto. In the present embodiment, the storage module 120 is configured with a two-layer architecture, including storage 122, and a tamper-proof ledger 124. As will be appreciated, the storage 122 and ledger 124 work together in order to allow storage module 120 to safeguard collected data assets and/or their metadata. More specifically, when data is stored in storage 122 (such as data assets and/or data asset metadata), the ledger 124 can store information relating to the stored data in a substantially immutable manner. This information can later be used to validate the stored data and verify that it has not been tampered with. As can be appreciated, by storing and certifying data asset metadata, the integrity of data assets can be established based on the certified metadata. In some embodiments, the data assets themselves can be safeguarded by storing them in storage 122, although this is not required to establish the integrity of a data asset under the collector's 110 supervision.

In the present embodiment, the storage 122 is configured to store one or more copies of collected data assets (or portions thereof) and/or data asset metadata remotely from where such data assets were generated. The storage 122 can comprise, for example, one or more databases or other storage mechanisms. As can be appreciated, the storage 122 can be centralized and/or distributed among several storage nodes. In some embodiments, the storage 122 can be configured as an append-only data structure. In other words, in such embodiments, storage 122 only allows for data to be added, and does not allow for existing data to be changed or removed. In this fashion, an entire history of data transactions in storage 122 can be maintained. Moreover, this can allow for high-throughput and low-latency data storage mechanism.

The ledger 124 is configured to store metadata relating to the collected data assets. The metadata stored in ledger 124 can be used, for example, to identify data assets and/or ensure the security and/or integrity thereof. For example, metadata stored in the ledger 124 can include: a unique identifier for a data asset; the type of asset (ex: log, text, picture, etc.); the asset's origin (ex: the asset's location on a network, including an IP address, hostname, folder, etc.); an identification of the collecting agent (ex: a locally deployed logger); the owner of the data asset (ex: employer name, asset creator, etc.); the asset's security classification (ex: secret/top-secret); the asset's creation, update, access, modification times; the size of the data asset (ex: the number of bytes/lines/etc. in the data asset); the status of the data asset (ex: normal, error); a cryptographic hash representation of the data asset, or any other type of fingerprint describing the asset and/or its current state; etc. It is appreciated that any other type of metadata relating to the data assets and/or the context in which it was collected or stored can also be used. As can be appreciated, the ledger 124 is preferably immutable (i.e. highly tamper-resistant) to maintain a certifiable record of stored data assets. The ledger 124 can be implemented using various technologies, and can be centralized, decentralized or distributed. For example, the ledger 124 can be implemented via tangle, hashgraph, blockchain, or other similar technologies. In some embodiments, for example where the ledger 124 is distributed, a private local copy of the ledger can be stored, and the private copy can be certified via a consensus on a public network.

The data consumer module 130 allows for stored data assets to be accessed from the storage module 120 and/or to verify the integrity of any data asset represented via metadata stored in 124, even if the actual data asset is not stored in storage 122. As can be appreciated, stored data assets can be accessed for a number of different reasons, including validation, analysis, creating or restoring data, etc. In some embodiments, the stored data can be accessed on the same system where data assets are stored via storage module 120, whereas in other embodiments, data assets can be accessed by remote systems.

Figure 2:
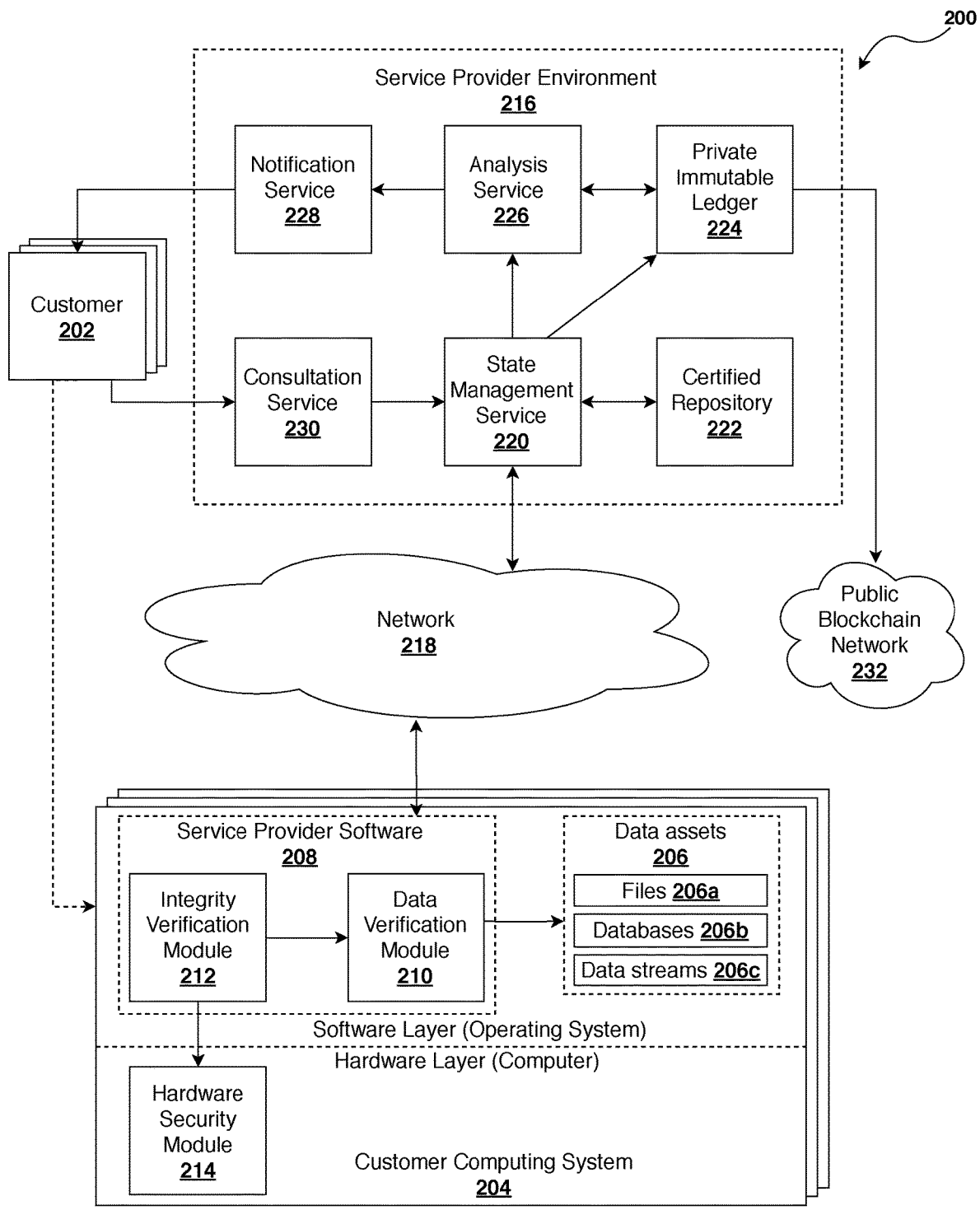
FIG. 2 is a schematic illustrating a platform for certifying integrity of data assets, according to an embodiment.

With reference now to FIG. 2, an exemplary platform 200 for certifying the integrity of data assets is shown according to an embodiment. In the illustrated configuration, data assets are generated and/or owned by one or more customers 202, and a service provider is responsible for taking custody of said data assets and certifying the integrity of the same. It is appreciated that the presented client/service provider relationship is for illustrative purposes only, and that other configurations of platform 200 are also possible.

Customers 202 can each have one or more computing systems 204 which are capable of generating data assets 206. A computing system 204 can correspond to any type of device having data processing and/or storage capabilities, including any system capable of generating, storing and/or manipulating data assets 206. For example, customer computing system 204 can correspond to a physical device (such as a desktop computer, laptop computer, smartphone, tablet, server, controller, etc.), a virtual device (such as a virtual machine), or a network of multiple physical and/or virtual devices. The data assets 206 generated by computing system 204 can be of different types, including files 206a, databases 206b and data stream 206c, among others.

A software module 208 is provided on computing system 204 in order to collect and/or monitor data assets 206 generated thereon. In the present embodiment, the software module 208 is provided and/or managed by the service provider and includes modules to verify the integrity of the data assets 206 in addition to the integrity of the computing system 204. More specifically, the software module 208 includes a data verification module 210 which is responsible for monitoring the data assets 206 in the software layer (i.e. in the operating system) to detect changes and compute fingerprints which can eventually be used to verify whether the data assets 206 have been tampered with. The software module 208 can further include an integrity verification module 212 which is responsible for ensuring that the hardware and/or software of the computer system 204 is in a known good state. For example, the integrity verification module 212 can communicate with a hardware security module 214 installed in computing system 204 (if available) to ensure that the computing system hardware, its configuration, firmware, bootloader and operating system has not been changed or tampered with. The integrity verification module 212 can further monitor the data verification module 210 to ensure that it has not been compromised or tampered with in any way.

Figure 3:
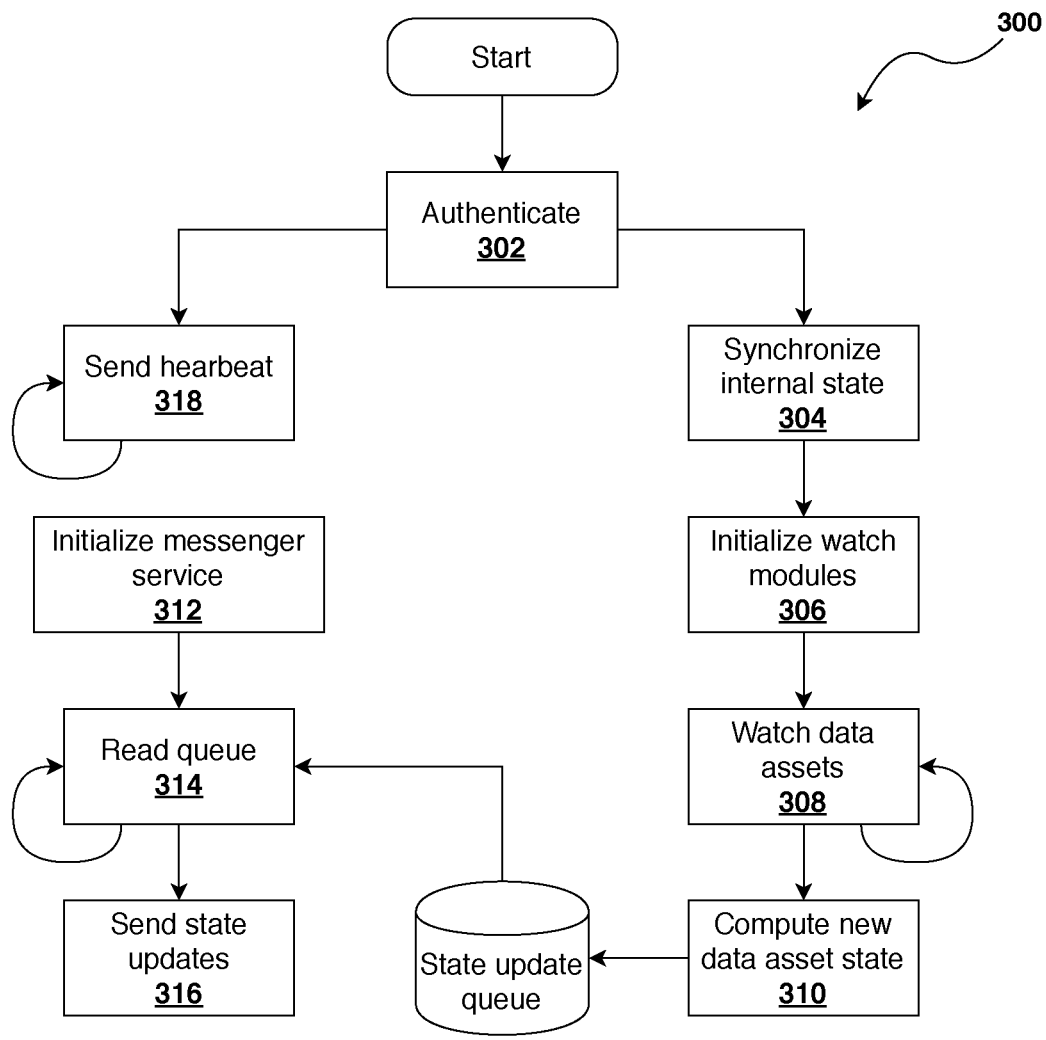
FIG. 3 is a flowchart illustrating a process for monitoring data assets and reporting changes, according to an embodiment.

In operation, the software module 208 can communicate with a service provider environment 216 in order to report changes made to data assets 206. With reference to FIG. 3, an exemplary process 300 for monitoring data assets and reporting changes via data verification module 210 is shown according to an embodiment. A first step 302 can comprise authenticating the data verification module 210 with service provider environment 216. In so doing, the service provider environment 216 can confirm the specific customer computing system 204 on which data verification module 210 is running and confirm that data verification module 210 is authorized and operating in an expected way. Once authenticated, a subsequent step 304 can comprise synchronizing an internal state of the data verification module 210 with the service provider environment 216 and/or with a state previously saved on the local machine. In this fashion, the data verification module 210 can be made aware of the most recently reported states of data assets, and these states can be used as an initial reference to detect changes in data assets. Following synchronization, a subsequent step can comprise initializing one or more data asset watch modules 306. During initialization, a state of all data assets can be sent to the service provider environment 216 to verify that the data assets were not tampered with or modified while the data asset watch modules were not running. Once the data asset watch modules are initialized, a subsequent step 308 can comprise watching the data assets in order to look for changes. As can be appreciated, in step 308, the data assets can be monitored continuously in order to determine whether a data asset has changed, for example if its state differs from a most recently reported state of the data assets. In the event that a change has been detected in a data asset, a new data asset state can be computed 310 for that data asset. As can be appreciated, the state can be computed in different manners depending on the type of data asset. For example, in some embodiments, a cryptographic function can be used to summarize the state of a data asset. The function can rely on different parameters, including any relevant metadata and/or fingerprints relevant to identifying the data assets, and/or the context in which the data asset has been modified. Once computed, the new data asset state can be stored in a state update queue which can, for example, be an in-memory queue.

In parallel, following authentication 302, a messenger service can be initialized in step 312, and the service can continuously read the state update queue 314, and report the state updates to the service provider environment 216 in step 316. As can be appreciated, in step 316, state updates can be sent at regular intervals and/or each time a new state update has been added to the queue. As can be further appreciated, in addition to state updates, the data verification module 210 can communicate other information to service provider environment 216 if necessary. For example, in the present embodiment, a heartbeat 318 is sent to service provider environment 216 at regular intervals, to notify the same that data verification module 210 is operating nominally. As can be appreciated, this can be useful to confirm that data verification module 210 is operational even if a data asset state update hasn't been reported for an extended period of time. In some embodiments, the messenger service can further be configured to receive messages from the service provider environment 216 and communicate them to service provider software 208. This can be used, for example, to allow for the service provider environment 216 to perform on-demand requests to the data verification module 210. In some implementations, this can allow for the local file system of computing system 204 to be browsed remotely, and allow for the files to be added to the verification modules 210 watchlist, all via the service provider environment 216.

Figure 4:
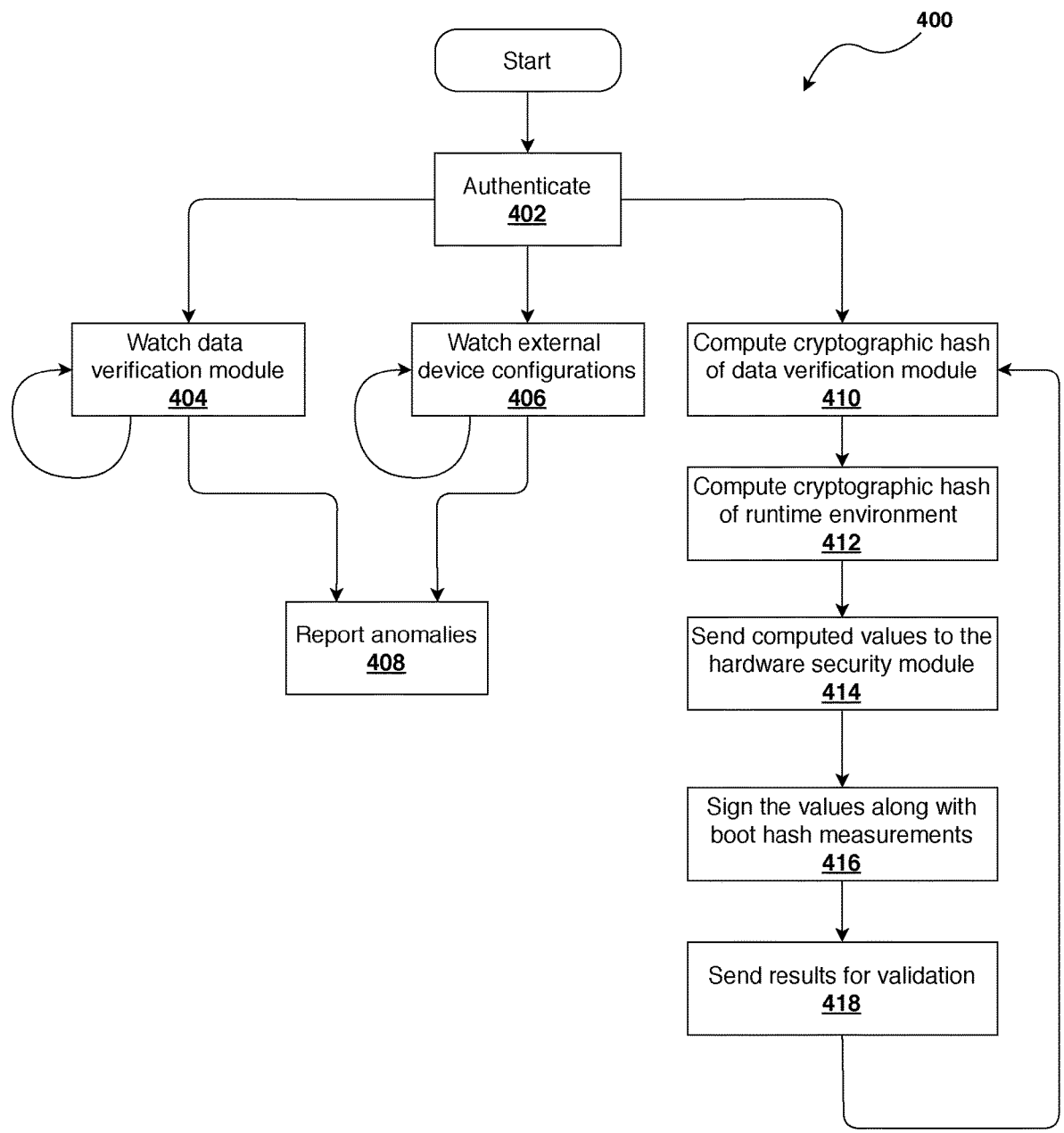
FIG. 4 is a flowchart illustrating a process for monitoring the integrity of a computing system, according to an embodiment.

With reference now to FIG. 4, an exemplary process 400 for monitoring the integrity of customer computing system 204 via integrity verification module 212 is shown according to an embodiment. A first step 402 can comprise authenticating the integrity verification module 212 with the service provider environment 216. In so doing, the service provider environment 216 can confirm the specific customer computing system 204 on which the integrity verification module 212 is running and confirm that the integrity verification module 212 is operating in an expected way. Once authenticated, subsequent steps can comprise continuously watching and verifying data verification module 404 and watching external device configuration 406. For example, in step 404, watching data verification module 210 can comprise inspecting binaries of module 210 loaded into computing system 204 memory to verify that no changes have been made thereto. Similarly, in step 406, watching external device configurations can comprise continuously inspecting device configuration parameters of plug-and-play I/O devices such as a keyboard, monitor, USB key, or other peripheral or external devices, to assure that all parameters are set to expected values. As can be appreciated, the integrity validation module 212 can communicate with service provider environment 216 in order to confirm that the monitored hardware and/or software is operating as expected. For example, this can comprise computing a cryptographic hash of data verification module 410, computing a cryptographic hash of the runtime environment 412, sending the computed values to the hardware security module 414, signing the values using the hardware security module 214 along with boot hash measurements 416, and sending the signed results to the service provider environment 216 for validation 418. If any anomalies have been detected (for example if any code and/or hardware has failed, changed, or behaving in a manner which would indicate it has been compromised in any way), such anomalies can be reported to the service provider environment 216 in step 408.

As can be appreciated, the service provider environment 216 can comprise one or more modules owned and/or managed by the service provider, said modules providing the necessary functionality to record changes to data assets 206, analyze changes to certify the data assets 206, and/or record and report data asset anomalies, among others. Referring back to FIG. 2, in the illustrated embodiment, the service provider environment 216 comprises the following modules: a state management service 220, a certified repository 222, a private immutable ledger 224, an analysis service 226, a notification service 228, and a consultation service 230. Although a particular set of modules is described herein, it is appreciated that in other embodiments, a different combination of modules can be provided. Moreover, additional or fewer modules can be provided depending on the required functionality.

The modules of the service provider environment 216 can be implemented via software running on one or more computing devices, such as a server or a network of servers. In the present embodiment, the service provider environment 216 is separate from the customer computing system 204 and is implemented via computing devices which are physically separate from customer computing system 204. Accordingly, the software module 208 communicates with the service provider environment 216 over a network 218. As can be appreciated, depending on the separation between the customer computing system 204 and the service provider environment 216, the network 218 can be of different types, such as a local area network (LAN), a wide area network (WAN), such as the internet, among others.

In more detail now, the state management service module 220 is configured to manage data asset state updates with other services in the service provider environment 216. In the present embodiment, changes to data assets 206 are reported by the data verification module 210 of the service provider software 208 and are received via the state management service module 220. As can be appreciated, state updates of data assets 206 can be communicated to state management service module 220 in a number of different manners. For example, in some embodiments, each time a data asset 206 changes, a state representation can be sent from the service provider software module 208 to the service provider environment 216. In other embodiments, a state representation can be sent at predetermined regular intervals. Such state representation can comprise a cryptographic representation summarizing the current state of data asset 206, including any metadata relating thereto. The state representation can additionally or alternatively comprise a current copy of data asset 206 and/or a copy of an incremental change made to data asset 206. Upon receipt of a reported change to data asset 206, the state management service module 220 can communicate such changes to certified repository module 222 and/or the private immutable ledger 224, as required.

In the present embodiment, the certified repository module 222 serves to store a copy of data assets 206 remotely from customer computing system 204. For example, if it is desired to retain a copy of a data asset (for example for data loss prevention), a copy of the data asset 206 can be stored in certified repository 222 for later retrieval. In some embodiments, a full copy of data asset 206 can be received from state management service 220, and that full copy can be stored in repository to retain a current state of the data asset 206. In other embodiments, an incremental change to data asset 206 can be received, and an existing copy of data asset 206 in certified repository 222 can be modified or appended based on the reported change. In some embodiments, the repository 222 can retain a full history of data assets 206 and any changes thereto, whereas in other embodiments, the repository 222 can retain only a most recent state of data assets 206. It is appreciated that other mechanisms for storing data assets 206 and managing certified repository 222 are also possible.

The private immutable ledger 224 serves to store a substantially immutable record of data asset states, which can subsequently be used to verify whether or not a data asset 206 is in an expected or known good state. In the present embodiment, upon receiving a state representation of a data asset from service provider software 208, the state management service 220 can commit the state representation to the ledger 224. In so doing, the state of data asset 206 at a given point of time is recorded. As can be appreciated, the ledger 224 is preferably configured to be substantially tamper-proof and immutable, such that when a state of data asset 206 at a given point in time is recorded, that record is permanent and cannot be modified. This can be accomplished, for example, using any data structure where the latest state is cryptographically linked to previous states (ex: Merkle tree). In this fashion, the fidelity of data asset states recorded in ledger 224 can be assured, providing a trusted reference of the expected states of data assets at given points in time. In the present embodiment, the ledger 224 is rendered substantially immutable via immutable ledger technology which can be embodied in various forms (i.e., private permissioned blockchain, Merkle tree, etc.). The ledger 224 is stored privately in service provider environment 216, however it is appreciated that the state of the private ledger 224 can be regularly published to a public blockchain network 232, such as Ethereum or other popular networks where there are enough users to prevent a consensus attack. This can effectively notarize the state of the private ledger 224 and decentralize trust from the service provider environment 216. In some embodiments, other elements of the service provider environment 216 can be notarized to enhance trust in the latter.

The analysis service module 226 serves to analyze data asset to identify any potential anomalies. More specifically, the analysis module 226 is configured to compare expected or certified states of data assets with actual or current states of data assets to determine differences therebetween. For example, in some embodiments, the analysis module 226 can compare a current state of a data asset 206 on customer computing system 204 with the certified state as recorded in the ledger 224 and note any differences. In other embodiments, the analysis module 226 can also compare a local copy of a data asset 206 (i.e. a copy of a data asset currently on the customer system 204) with a certified copy of the data asset 206 stored in the certified repository 222. If any differences are detected, a discrepancy report can be generated to identify such differences. In some embodiments, the discrepancy report can be recorded on the ledger 224 to create a permanent verifiable record thereof. Moreover, a message can be sent to customer 202 to notify them of the discrepancy. For example, in the present embodiment, notification service module 228 sends an electronic message to customer to notify them of detected anomalies and/or the details thereof. The electronic message can be of one or more different types, including text messages, e-mails, push notifications, among others. In some embodiments, the analysis module 226 can further be used to analyze and/or validate data verification module 210 and/or integrity verification module 212, in addition to any other module running on customer computing system 204, if required. For example, if either of these modules 210, 212 stop operating or shutdown unexpectedly (ex: if a heartbeat has not been received within a predetermined period), or if the modules 210, 212 report any type of anomaly (ex: tampering detected with system 204 hardware, or with software 208 code), and anomaly report can be generated and recorded to ledger 224 and/or reported to customer 202 via notification service 228.

The consultation service module 230 allows customers 202 and/or other authorized users to access information in the service provider environment 216 as required. For example, consultation module 230 can provide an interface allowing authorized users to access one or more modules of the service provider environment 216, for example to retrieve data asset states stored in the ledger 224, certified copies of assets stored in repository 222, among others. As can be appreciated, this can allow authorized users to certify and/or verify a data asset on demand. For example, in some embodiments, users can request a latest state of a data asset in order to verify whether a local data asset is in the same state, thereby confirming that the local asset is true and accurate. In some embodiments, users can send a local copy of a data asset via consultation module 230, which will then cause the analysis module 226 to analyze the received data asset, and determine whether or not it has been tampered with by calculating the state of the received data asset and comparing it with certified state data sorted in ledger 224 and/or by comparing the data asset with a certified copy of the corresponding data asset in repository 222. In other embodiments, users can calculate the state of a data asset on their end, and send the calculated state via consultation module 230, which will then cause the analysis module 226 to compare the received state with a corresponding certified state stored in ledger 224. In this fashion, a copy of the file does not need to be uploaded in order to be certified. As can be further appreciated, in some embodiment, users can obtain a certified copy of a data asset (i.e. a latest or a previous copy stored in repository 222) via consultation service 230. The obtained certified copy can be used, for example, for comparison with a local copy of a data asset, and/or to restore a lost, damaged, or compromised local data asset with a certified copy.

The above-described platform provides an environment with an end-to-end chain of trust through which data assets (including the data assets themselves and/or state information relating thereto) can be collected and their integrity guaranteed remotely. In the described embodiments, the data assets are guaranteed by a third party, corresponding to a service provider, thus decentralizing trust from the customer creating the data assets. The data retained by the third party can also be certified and externally verified by way of a public blockchain network, or other decentralized or distributed immutable ledger technology. As can be appreciated, the platform can be configured to take custody of various different types of data assets, and the architecture of the platform can be adapted to meet different needs, all the while performing the core function of certifying and/or verifying the integrity of data.

Figure 5:
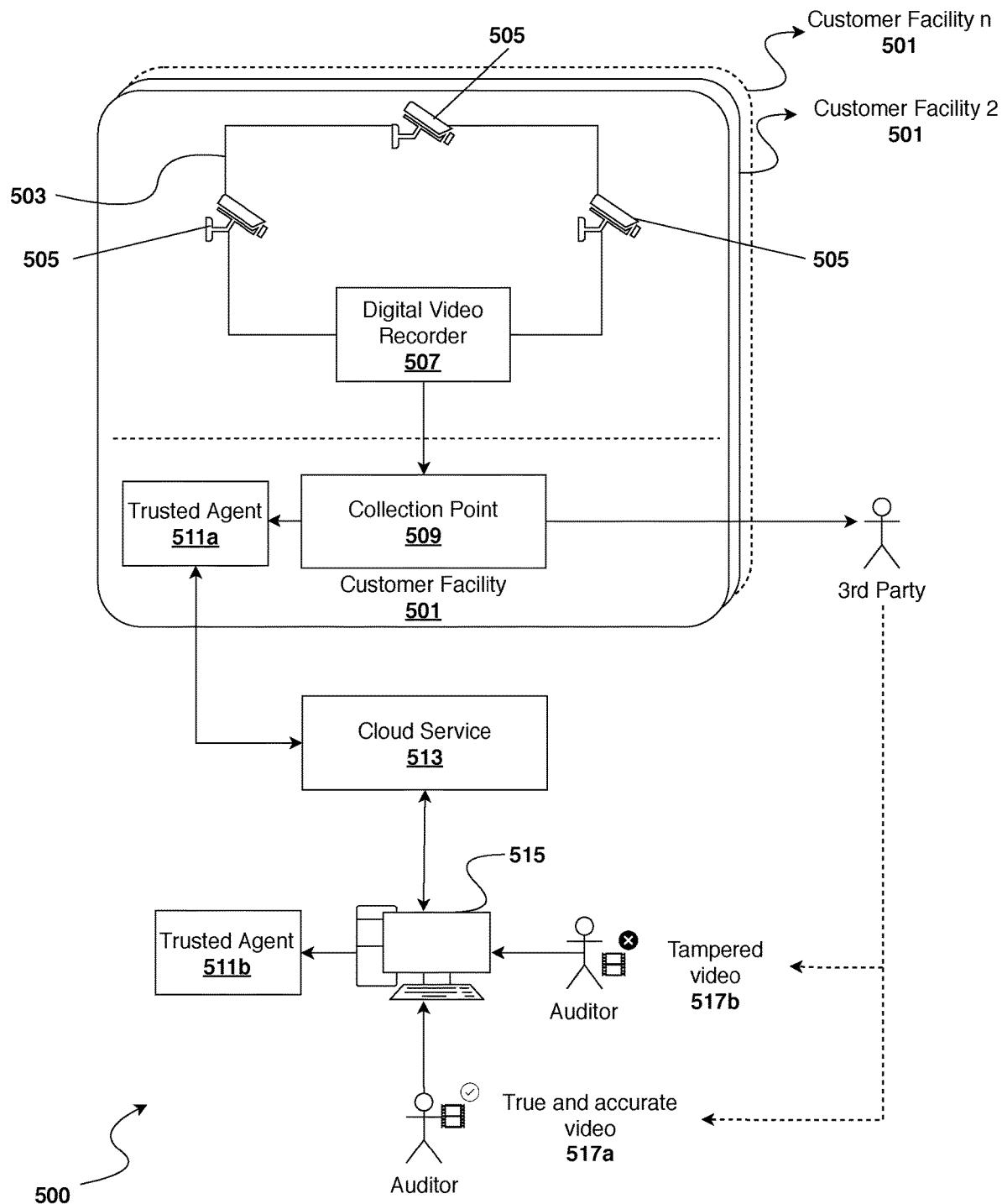
FIG. 5 is a schematic illustrating a system for certifying integrity of video surveillance footage, according to an embodiment.

By way of example, and with reference to FIG. 5, a system 500 for certifying integrity of video surveillance footage is provided. The system 500 is an implementation of the platform 200 described above, in which a service provider is certifying integrity of data assets for a customer. In the illustrated embodiment, a customer can have one or more facilities 501 which are monitored via video surveillance. More specifically, facility 501 has a closed-circuit video surveillance system 503 including one or more video cameras 505 whose video is aggregated and recorded on a digital video recorder 507. The recorded video is exported to a networked collection point 509 either manually, or regularly at predetermined intervals. Once recorded video reaches the collection point, it can be subject to further analysis, storage, and/or may be exported to $3^{rd}$ parties upon request. As can be appreciated, once the videos are exported to $3^{rd}$ parties, they can be subject to modification or tampering. It is therefore desired to have a mechanism to irrefutably prove that a video is true and accurate, for example if the video is to be used as proof.

In the present embodiment, certification of recorded surveillance video is achieved by deploying a trusted agent software 511a to the networked collection point 509. Each time a new video file asset is received from the digital video recorder 507, a state representation is automatically created from the video file in the form of a cryptographic time-stamped signature. This signature is sent to a service provider environment, for example implemented as a private or service-provider managed cloud service 513. The cloud service 513 can then record the signature in a trusted a substantially immutable manner. In the present embodiment, the video file never leaves the customer facility 501 and remains at the collection point 509. It is appreciated, however, that in other embodiments, for example when a backup service is desired, a copy of the video file can be sent via trusted agent 511a to cloud service 513 for storage thereon.

In the present configuration, an auditor can verify the integrity of a video file at any point in the future. For example, a computing system 515 can be provided with access to the cloud service 513. The computing system 515 can have a trusted agent 511b deployed thereon which allows for local verification of videos. In operation, the auditor can be provided with a video for verification on the computing system 515. The trusted agent 511b can then verify the integrity of the received video file locally, for example using signatures received from cloud service 513.

If the video is determined to be true and accurate 517*a*, a confirmation with a detailed report on the video asset 517*a* can be provided. If the video is determined to be invalid or tampered with 517*b*, a detail proof of the invalidity of the video asset 517*b* can be provided, including an indication of discrepancies, if applicable. In the present embodiment, when an auditor is verifying a video asset, that video asset does not leave the computing system 515. Instead, only the required signature is retrieved from the cloud service 513 for carrying out the verification. It is appreciated that in other embodiments, other verification processes are also possible. For example, in some embodiments, the agent 511*b* can calculate a signature of the video locally and send the signature to the cloud service 513 for remote analysis. Similarly, in some embodiments, a copy of the video file can be sent to the cloud service 513 for remote analysis. Moreover, in some embodiments, if an analyzed video is determined to be tampered with 517*b*, the tampered video file 517*b* and/or its signature can be sent to cloud service 513 for remote storage as an evidentiary record.

Although a particular example of video surveillance has been provided, it is appreciated that the platform can have a wide variety of other applications as well. For example, in some embodiments, the platform can be used as part of a system for cyber evidence collection and management. Such a system can include a logger service deployed to one or more machines which can continually monitor local logs of said machines and transmit new log events for recording in a tamper-proof immutable ledger and/or for storage in a certified database. An analyzer service can verify local logs of machines at regular intervals, in order to confirm that they correspond to what is stored in the certified database and/or blockchain. If a discrepancy is detected, the analyzer service can obtain a copy of the local log, and a copy of a certified log, and compare the two in order to generate an anomaly report which identifies the discrepancies. Such an anomaly report can further be pushed to the immutable ledger to retain a record thereof.

In the foregoing specification, specific embodiments have been described. However, one of ordinary skill in the art appreciates that various modifications and changes can be made without departing from the scope of the invention. Accordingly, the specification and figures are to be regarded in an illustrative rather than a restrictive sense, and all such modifications are intended to be included within the scope of present teachings.

The invention claimed is:

1. A method for certifying integrity of data assets stored on a client computing system, the method comprising:
    detecting at least one new or changed data asset stored on the client computing system;
    responsive to detecting the at least one new or changed data asset, calculating a state representation of the least one data asset using a data verification module deployed to the client computing system, the state representation of the at least one data asset comprising a cryptographic representation of at least a portion of the data asset;
    calculating a state representation of the data verification module, the state representation of the data verification module comprising a cryptographic hash of the data verification module or a runtime environment of the data verification module;
    transmitting the state representation of the at least one data asset and the state representation of the data verification module over a network from the client computing system to a remote computing system
    validating, by the remote computing system, the state representation of the data verification module; and
    if the state representation of the data verification module is validated, storing, by the remote computing system, the state representation of the at least one data asset in an immutable ledger.

2. The method according to claim 1, wherein the state representation of the data verification module is calculated by an integrity verification module deployed to the client computing system, further wherein the method comprises a preliminary step of authenticating the integrity verification module and/or the data verification module with the remote computing system.

3. The method according to claim 1, wherein validating the state representation of the data verification module comprises analyzing the state representation of the data verification module on the remote computing system to determine whether the data verification module is operating in a known good state.

4. The method according to claim 1, comprising validating a hardware integrity of the client computing system using a hardware security module deployed to the client computing system.

5. The method according to claim 4, comprising:
    calculating a boot hash of the client computing system using the hardware security module;
    transmitting the calculated boot hash to the remote computing system; and
    analyzing the boot hash on the remote computing system to determine whether the client computing system hardware is in a known good state.

6. The method according to claim 4, further comprising:
    digitally signing the calculated state representation of the data verification module using the hardware security module prior to transmitting the state representation of the data verification module to the remote computing system; and
    validating the signed state representation of the data verification module on the remote computing system.

7. The method according to claim 1, further comprising:
    monitoring the client computing system to detect a change in the at least one data asset; and
    transmitting the state representation of the at least one data asset in response to the change being detected.

8. The method according to claim 7, further comprising:
    synchronizing the client computing system with a most recent state representation of the at least one data asset, as stored in the immutable ledger;
    calculating a current state representation of the at least one data asset; and
    detecting the change in the at least one data asset when the calculated current state representation differs from the synchronized state representation.

9. The method according to claim 7, wherein monitoring the client computing system comprises monitoring a predetermined set of data assets on the client computing system.

10. The method according to claim 1, wherein the state representation of the at least one data asset further comprises one or more of the following: a unique identifier for the at least one data asset; an origin of the at least one data asset; an identification of an agent having collected the at least one data asset; an owner of the at least one data asset; a security classification of the at least one data asset; a creation, update, access or modification time of the at least one data asset; a size of the at least one data asset; a status of the at least one data asset; and a digital fingerprint representative of the at least one data asset.

11. The method according to claim 1, further comprising transmitting at least a portion of the at least one data asset over the network to the remote computing system for storage.

12. The method according to claim 11, wherein the at least a portion of the at least one data asset comprises an integral copy of the at least one data asset.

13. The method according to claim 1, wherein the immutable ledger comprises a private ledger on the remote computing system, the method further comprising:
calculating a state representation of the private ledger; and
recording the state representation of the private ledger on a public blockchain network.

14. The method according to claim 1, further comprising receiving a data asset to be verified on the remote computing system, and determining whether the data asset to be verified corresponds to an original untampered copy of the at least one data asset stored on the client computing system by:
calculating a state representation of the received data asset; and
comparing the calculated state representation of the received data asset with a corresponding state representation stored in the immutable ledger.

15. A system for certifying integrity of data assets, comprising:
a client computing system, comprising:
a storage module;
a data verification module configured to detect at least one new or changed data asset stored in the storage module, and responsive to detecting the at least one new or changed data asset, calculate a state representation of the at least one data asset, the state representation of the at least one data asset comprising a cryptographic representation of at least a portion of the data asset;
an integrity validation module configured to calculate a state representation of the data verification module, the state representation of the data verification module comprising a cryptographic hash of the data verification module or a runtime environment of the data verification module; and
a communication module configured to transmit the state representation of the at least one data asset and the state representation of the data verification module over a network; and
a remote computing system configured to receive the state representation of the at least one data asset and the state representation of the data verification module over the network, validate the state representation of the data verification module, and if the state representation of the data verification module is validated, store the state representation of the at least one data asset in an immutable ledger.

16. A method for verifying integrity of data assets originating from a client computing system, the method comprising:
receiving, on a verification system remote from the client computing system, a state representation corresponding to a data asset to be verified;
receiving, on the verification system, a state representation corresponding to a data verification module of a client computing system where a certified state representation of the data asset was originally calculated;
retrieving, by the verification system, the certified state representation from an immutable ledger, the certified state representation having been generated by the client computing system from which the data asset originated responsive to detecting a creation of the data asset or a modification of the data asset;
identifying anomalies in the data asset by comparing, via the verification system, the received state representation of the data asset with the certified state representation;
identifying anomalies in the data verification module by validating, via the verification system, the received state representation of the data verification module; and
generating at least one report indicating whether the integrity of the received data asset and/or the data verification module can be verified based on the existence or absence of anomalies.

17. A system for verifying integrity of data assets originating from a remote client computing system, comprising:
an input module configured to receive a state representation corresponding to a data asset to be verified, and to receive a state representation corresponding to a data verification module of a client computing system where a certified state representation of the data asset was originally calculated;
a communications module configured to retrieve the certified state representation from an immutable ledger, the certified state representation having been generated by the remote client computing system from which the data asset originated responsive to detecting a creation of the data asset or a modification of the data asset; and
at least one verification module configured to:
identify anomalies in the data asset by comparing the received state representation of the data asset with the certified state representation;
identify anomalies in the data verification module by validating the received state representation of the data verification module; and
generate at least one report indicating whether the integrity of the data asset and/or the data verification module can be verified based on the existence or absence of anomalies.

* * * * *